(12) United States Patent
Baumgart et al.

(10) Patent No.: US 9,410,746 B2
(45) Date of Patent: Aug. 9, 2016

(54) TEMPERATURE-REGULATING ELEMENT

(71) Applicant: BASF SE, Ludwigshafen (DE)

(72) Inventors: Patrick Baumgart, Gonbach (DE); Oliver Kraemer, Gimbsheim (DE)

(73) Assignee: BASF SE, Ludwigshafen (DE)

( * ) Notice: Subject to any disclaimer, the term of this patent is extended or adjusted under 35 U.S.C. 154(b) by 135 days.

(21) Appl. No.: 14/219,408

(22) Filed: Mar. 19, 2014

(65) Prior Publication Data

US 2014/0287292 A1 Sep. 25, 2014

Related U.S. Application Data

(60) Provisional application No. 61/803,487, filed on Mar. 20, 2013.

(51) Int. Cl.
*H01M 10/60* (2014.01)
*F28D 15/02* (2006.01)
(Continued)

(52) U.S. Cl.
CPC ............ *F28D 15/02* (2013.01); *H01M 10/6556* (2015.04); *H01M 10/0525* (2013.01); *Y02T 10/7011* (2013.01); *Y10T 29/4935* (2015.01)

(58) Field of Classification Search
CPC  H01M 10/617; H01M 10/613; H01M 10/615
See application file for complete search history.

(56) References Cited

U.S. PATENT DOCUMENTS

| 2007/0062674 | A1 | 3/2007 | Ippoushi et al. |
| 2009/0090490 | A1 | 4/2009 | Yoshida et al. |
| 2011/0039133 | A1* | 2/2011 | Lee .................. H01M 2/0404 429/7 |

FOREIGN PATENT DOCUMENTS

| DE | 20 2006 017181 U1 | 4/2007 |
| DE | 10 2007 034 740 A1 | 1/2009 |

(Continued)

OTHER PUBLICATIONS

Behr GmbH & Co. KG, "Thermomanagement bei Hybridfahrzeugen", Technical Press Conference, 2009, 20 pages.

(Continued)

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

The present invention provides a temperature-regulating element (1) having a thermally conductive surface (3) and a thermally insulating surface (5), said temperature-regulating element comprising a metallic plate (7) having elevations (9), a main body (11) composed of plastic and two connection components (17a, 17b) comprised of plastic. At least one continuous channel (13) for receiving a temperature-regulating medium is formed between the metallic plate (7) and the main body (11), said at least one continuous channel extending from one end face (15a) to an opposite end face (15b) of the main body (11) and being connected to a temperature-regulating medium circuit by the connection components (17a, 17b). The temperature-regulating element (1) is designed such that the main body (11) at least partly surrounds the metallic plate (7). A method for producing a temperature-regulating element, a use of the temperature-regulating element (1) in a lithium-ion battery (101), and a lithium-ion battery (101) comprising the temperature-regulating element (1) are furthermore specified.

14 Claims, 7 Drawing Sheets

(51) Int. Cl.
*H01M 10/6556* (2014.01)
*H01M 10/0525* (2010.01)

(56) References Cited

FOREIGN PATENT DOCUMENTS

| | | |
|---|---|---|
| DE | 11 2007 000 829 T5 | 2/2009 |
| DE | 10 2009/05880 A1 | 6/2011 |
| EP | 0 065 679 A1 | 12/1982 |
| EP | 2 337 142 | 6/2011 |
| EP | 2418717 A1 | 2/2012 |
| GB | 1 501 084 A1 | 2/1978 |
| JP | 2006 351 561 A1 | 12/2006 |

OTHER PUBLICATIONS

Fraunhofer-Gesellschaft , "Hoffnungsträger Lithium-Batterie", Press Release , Mar. 15, 2012, 12 pages.

* cited by examiner

TEMPERATURE-REGULATING ELEMENT

This patent application claims the benefit of pending U.S. provisional patent application Ser. No. 61/803,487 filed on Mar. 20, 2013 incorporated in its entirety herein by reference.

The present invention relates to a temperature-regulating element having a thermally conductive surface and a thermally insulating surface, and to a method for producing said temperature-regulating element, and to the use of the temperature-regulating element in lithium-ion batteries.

Temperature-regulating elements, in particular cooling elements, are known in principle from the prior art and are used for various heat-emitting assemblies such as batteries, fuel cells, semiconductor components or electrical components. Thus, DE 10 2007 034 740 A1 describes a fuel cell unit in which a cooling device for cooling the current tap is arranged at the pole plate in order to prevent the membrane from drying out as a result of heat input from outside, wherein the cooling device has a cooling channel for a cooling medium. Furthermore, DE 11 2007 000 829 T5 describes a cooler for a power converter, wherein the cooler has a substrate for arranging a heat-generating element, a heat-dissipating component and two flow path configuration components, such that a coolant can come into contact with the heat-dissipating component.

Various concepts have been proposed in recent years particularly for the cooling of lithium-ion batteries. Lithium-ion batteries constitute a key component for electrical energy stores such as are used for hybrid or electric vehicles, for example. Lithium-ion batteries are superior to conventional electrical energy storage systems owing to their higher power and energy density, very compact dimensions, a high charging and discharging efficiency and their high cycling ability. However, lithium-ion batteries operate efficiently only in a temperature window of between −10° C. and 40° C. Above 40° C. the service life is significantly reduced, while below −10° C. the power falls and the efficiency decreases significantly. Consequently, a sufficient thermal conditioning of lithium-ion batteries is necessary in order to achieve a satisfactory balance between the requirements in respect of service life and efficiency.

According to the prior art (cf. e.g. "Thermomanagement bei Hybridfahrzeugen" ["Thermal management in hybrid vehicles"], Behr GmbH & Co. KG, Stuttgart, technical press conference 2009; "Hoffnungsträger Lithium-Batterie" ["Lithium battery a source of hope"], Fraunhofer-Gesellschaft, press release Mar. 15, 2012) it has hitherto been proposed to regulate the temperature of lithium-ion batteries, or the individual lithium-ion cells arranged therein, using cooled air or to arrange an additional evaporator in the form of a cooling plate in the battery or to use a heat exchanger in order to cool the batteries, or the cells, with the aid of an evaporating refrigerant in a secondary circuit. Despite many advantages, these cooling concepts also have disadvantages, and so there is a need for an improved temperature-regulating element. While the prior art generally describes cooling systems for batteries or other heat-generating components, it is not possible to use these systems also for heating lithium-ion batteries, for example, if the operating temperature falls below −10° C.

A further problem that has not been solved satisfactory hitherto by the prior art consists in the materials used. While metal tubes, for example flat aluminum tubes, through which a cooling medium flows are often used for lithium-ion batteries, onto which tubes a metal plate, for example an aluminum plate, is soldered, onto which in turn the individual lithium-ion cells are adhesively bonded, the electrical insulation, that is to say in particular the electrical breakdown strength, of the cooling plate remains unresolved. On the other hand, in the case of electrically insulating materials such as plastic, there is the problem of transferring the heat from the lithium-ion cell to the cooling medium through the electrically and thermally insulating material. In the case of cooling plates composed of plastic, certain minimum layer thicknesses are necessitated from the standpoint of production engineering, and the dimensioning thereof impedes the heat transfer.

Consequently, the object of the present invention is to provide a temperature-regulating element which overcomes the disadvantages of the prior art and offers satisfactory temperature regulation with at the same time good electrical insulation. Furthermore, the object of the present invention is to specify a method for producing such a cooling element and to provide a lithium-ion battery using the cooling element.

In the case of a temperature-regulating element of the type mentioned in the introduction, the first object is achieved by virtue of the fact that a material combination of metallic plate and plastic main body is provided, wherein a temperature-regulating medium can flow through the temperature-regulating element in channels provided therein.

The second object is achieved by means of a method for producing a temperature-regulating element in which firstly a metallic plate is surrounded with a plastic for a main body, thereby forming at least one channel for a temperature-regulating medium, and the temperature-regulating element is finally completed by connection components being fitted.

In a first aspect of the present invention, the first object mentioned above is achieved, in particular, by means of a temperature-regulating element (1) having a thermally conductive surface (3) and a thermally insulating surface (5), comprising a metallic plate (7), which is arranged at the thermally conductive surface (3) and which has elevations (9) at its side facing the thermally conductive surface (3), a main body (11) composed of plastic, which is substantially arranged on the side of the thermally insulating surface (5) and which at least partly surrounds the metallic plate (7), at least one continuous channel (13) for receiving a temperature-regulating medium is formed between the metallic plate (7) and the main body (11) in such a way that at least one wall of the at least one channel (13) is formed by the metallic plate (7) and the remaining walls of the at least one channel (13) are formed by the main body (11), wherein the at least one channel (13) extends from one end face (15a) to an opposite end face (15b) of the main body (11), two connection components (17a, 17b) composed of plastic, which are respectively arranged at the end faces (15a, 15b) and connect the at least one channel (13) to a temperature-regulating medium circuit, wherein the temperature-regulating element (1) is designed such that the main body (11) surrounds the metallic plate (7) at the side thereof facing the thermally conductive surface (3) at least in the regions which have no elevations (9), and that the main body (11) at least partly surrounds the metallic plate (7) marginally.

The present invention is based on the insight that a specific combination of metallic plate (7) and plastic main body (11) can result in an optimum balance between a good heat transfer from an object to be temperature-regulated to a temperature-regulating medium, on the one hand, and sufficient electrical insulation, on the other hand. Moreover, a lightweight temperature-regulating element is provided by the combination according to the invention.

It has surprisingly been found that with the temperature-regulating element (1) according to the invention, not only is it possible for an object that is to be temperature-regulated to be cooled reliably and in accordance with the external circumstances, but also it is possible for the object that is to be temperature-regulated to be heated within certain limits, for example in order to be able to set an optimum operating temperature even at low ambient temperatures. For this purpose, the temperature of the temperature-regulating medium flowing through the at least one channel (13) is set accordingly outside the temperature-regulating element. For optimally regulating the temperature of an object, the metallic plate (7) has elevations (9) at its side facing the thermally conductive surface (3), said elevations constituting a thermal bridge in the main body (11) composed of plastic.

The invention is presented in more precise detail below.

Within the meaning of the present invention, a "thermally conductive surface" is understood to mean that side of the temperature-regulating element (1) which substantially makes contact with an object to be temperature-regulated (or a plurality thereof). The heat transfer between the object to be temperature-regulated and the temperature-regulating medium takes place at the thermally conductive surface (3). By contrast, a "thermally insulating surface" is understood to mean the other side of the temperature-regulating element (1), which is substantially formed by the main body (11) composed of plastic.

The wording "a metallic plate (7), which is arranged at the thermally conductive surface (3)" should be understood such that the metallic plate (7) at least partly forms the thermally conductive surface (3), lies directly in proximity to the thermally conductive surface (3) or is at a distance therefrom at least in close proximity.

The metallic plate (7) is designed to be substantially planar, preferably with a rectangular basic shape, wherein the length and width of the metallic plate (7) are greater than the thickness thereof by a multiple. In one preferred embodiment, the metallic plate (7) has dimensions of between 8 cm×5 cm and 800 cm×500 cm.

The elevations (9) which the metallic plate (7) has can have an arbitrary geometrical shape. For reasons of production engineering, however, substantially rectangular geometrical shapes have proved to be expedient for the elevation (9).

In the combination according to the invention of metallic plate (7) and plastic main body (11), the metallic plate (7) serves for heat conduction, while the plastic serves for electrical insulation and ensures the mechanical strength and the impermeability of the temperature-regulating element (1). Therefore, the dimensions of the main body (11) are chosen such that together with the chosen plastic they yield a sufficient mechanical strength. It has proved to be advantageous if the main body (11) has a thickness of between 0.5 cm and 10 cm, preferably between 1 cm and 3 cm.

The plastic of the main body (11) at least partly surrounds the metallic plate (7), that is to say that it covers at least those regions of the metallic plate (7) at the side thereof facing the thermally conductive surface (3) which have no elevations. Moreover, the plastic of the main body (11) encloses the metallic plate (7) at least at two opposite edges, such that the metallic plate (7) is fixedly held in the plastic main body (11).

Alongside the mechanical retention of the metallic plate (7), moreover, the enclosure with the plastic also ensures an electrical insulation marginally. The at least two opposite edges enclosed with the plastic extend, in particular, between the end faces (15a, 15b).

At least one continuous channel (13) through which a temperature-regulating medium can flow is provided in the interior of the temperature-regulating element (1). The channel (13) extends from one end face (15a) to the opposite end face (15b) and is designed such that at least one wall of the channel (13) is formed by the metallic plate (7), while the remaining walls are formed by the plastic main body (11). This arrangement ensures that the temperature-regulating medium is in direct contact with the highly thermally conductive metal of the plate (7), thereby ensuring an optimum heat transfer. The channel walls need not necessarily be embodied as rectilinear and/or plane. Depending on the installation geometry of the temperature-regulating element (1), the channels can also run in curved form and/or the channel walls can have a curvature. Moreover, the channel cross section need not necessarily be embodied as rectangular, but rather can, in principle, have any arbitrary geometrical shape.

Connection components (17a, 17b) composed of plastic are respectively arranged at the end faces (15a, 15b) between which at least one channel (13) extends. The wording "connect the at least one channel (13) to a temperature-regulating medium circuit" within the meaning of the present invention is understood such that the connection components (17a, 17b) form a collector and/or a distributor for the temperature-regulating medium flowing in the at least one channel (13). In other words, that means that the temperature-regulating medium is fed to the at least one channel (13) via one of the connection components (17a, 17b) and is discharged again through the opposite connection component (17a, 17b). However, the connection component can in each case also serve for diverting the temperature-regulating medium from a first channel in the temperature-regulating element (1) into at least one further channel (13) of the temperature-regulating element (1).

The term "temperature-regulating element", as used here, within the meaning of the present invention should be understood such that the temperature-regulating element (1) is suitable both for cooling and for heating an object arranged on the thermally conductive surface (3). When an object to be temperature-regulated is mentioned in the present invention, this does not preclude the case that two or more objects can also be temperature-regulated.

In one development of the temperature-regulating element (1) according to the invention, the elevations (9) are exposed in the thermally conductive surface (3). This results in a particularly good heat transfer between an object to be temperature-regulated and the temperature-regulating medium. For electrically insulating an object to be temperature-regulated relative to a temperature-regulating element (1) configured in this way, the object must be fixed on the temperature-regulating element by means of a contact material which ensures the electrical insulation. By way of example, in one specific embodiment, an individual battery cell can be fixed by its at least partly metallic housing to the temperature-regulating element (1) by means of an electrically insulating adhesive. It is optionally necessary for this purpose to treat the metallic surface of the plate (7) and/or of the individual cell(s) with an adhesion promoter.

In an alternative development of the temperature-regulating element (1) according to the invention, the elevations (9) are covered by the plastic of the main body (11) in the thermally conductive surface (3). A sufficient electrical insulation between the object to be temperature-regulated and the metallic plate (7) is thereby ensured without further measures. If, for example, a battery cell is intended to be adhesively bonded onto the temperature-regulating element (1), the use of an adhesion promoter is generally unnecessary in this embodiment. The layer thickness of the plastic on the elevations (9) is preferably 1.0 mm or less, in particular 0.7 mm or less, and at least 0.3 mm.

In one configuration according to the invention, the metallic plate (7) has marginally at least partly a bead (19a) and/or a groove (19b), as a result of which a positively locking connection between the plastic main body (11) and the metallic plate (7) is ensured. The bead(s) (19a) and/or the groove(s) (19b) extend, in particular, between the end faces (15a, 15b).

It is preferred for the metallic plate (7) to have a thickness of 1 mm to 5 mm in the region of the elevation (9) and a thickness of 0.5 mm to 3 mm in the regions without an elevation (9). Metallic plates (7) having a smaller thickness are difficult to produce and have only inadequate mechanical strength, while metallic plates (7) having a larger thickness increase the volume of the temperature-regulating element (1) and the material costs unnecessarily.

For an optimum heat transfer between an object to be temperature-regulated and a temperature-regulating medium, it has proved to be advantageous if the elevations (9) are distributed substantially uniformly on the metallic plate (7). Additionally or alternatively, the elevations (9) can be arranged on the metallic plate (7) such that they substantially correspond to those regions of an object to be temperature-regulated which are to be temperature-regulated the most intensively. Furthermore, the elevations (9) can advantageously be arranged on the metallic plate (7) such that they substantially correspond to the at least one channel (13), with the result that the shortest possible path is produced for the heat transfer between object to be temperature-regulated and temperature-regulating medium.

In a further embodiment, at least one continuous cutout (21) through which the plastic of the main body (11) penetrates is provided in the metallic plate (7) in the regions without elevation (9). "Continuous cutout" is understood to mean, in principle, a hole of arbitrary geometry through which the plastic can be introduced into the lower part of the mold during the process of producing the temperature-regulating element (1). It may be advantageous, moreover, to provide more than one cutout (21), with the result that, during the production process, the plastic is introduced into the lower part of the mold in a manner distributed as uniformly as possible over the metallic plate (7). Alongside this advantage in terms of production engineering, a better positively locking connection between plastic main body (11) and metallic plate (7) arises, moreover, if the plastic penetrates through the metallic plate (7).

Furthermore, flow aids in the form of depressions or beads can additionally be arranged in the metallic plate (7), which facilitate the distribution of the plastic during production and make it more uniform. Moreover, said depressions or beads can increase the mechanical strength of the metallic plate (7).

For reasons of saving weight and on account of very good thermal conductivity, it has proved to be advantageous if the metallic plate (7) contains aluminum. In particular, the metallic plate (7) can consist of an aluminum base alloy.

It is preferred for the plastic of the main body (11) to be selected from polyamides, polyesters, polyphenylsulfones (PPSU), polysulfones (PSU) or polyethersulfones (PESU). These plastics firstly exhibit good processability and secondly impart sufficient mechanical strength to the temperature-regulating element (1). PA6 PA6.6, PA6.10, PA6.6/6.10, PA6/6T and polyphthalamide (PPA) are particularly preferred among the polyamides. Polybutylene terephthalate (PBT) is particularly preferred among the polyesters.

In one development of the invention, the plastic of the main body (11) can contain additives and/or reinforcing materials. Impact modifiers, hydrolysis stabilizers, heat stabilizers and further additional materials or auxiliaries can furthermore be contained as additives. The reinforcing materials can be glass fibers, carbon fibers, glass spheres or various mineral fillings.

The selection of the plastic for the main body (11) in combination with suitable additives and/or reinforcing materials and with the material selection for the metallic plate (7) makes it possible to coordinate the coefficients of thermal expansion of both components with one another to an extent such that mechanical stresses of an order of magnitude which can be tolerated for the size of the temperature-regulating element or can be withstood by the geometry arise upon use as intended in the temperature range of between −40° C. and 85° C.

The at least one channel (13) of the temperature-regulating element (1) advantageously has a clear height of 3 mm to 15 mm, preferably 5 mm to 12 mm, and a clear width of 5 mm to 100 mm, preferably 10 mm to 30 mm. The relation according to the invention between clear height and clear width of the channel (13) results in a good flow of the temperature-regulating medium with at the same time an optimized heat transfer.

In order to ensure a good pressure distribution into the channel (13) in the case of pressurized cooling medium, internals (23) for pressure distribution are provided in the channel (13). Alternatively or additionally, internals (23) can be provided which serve for swirling of the temperature-regulating medium and thus offer a further improved temperature-regulating capacity. Both functions can be realized in one type of internals (23).

In one specific embodiment, the temperature-regulating medium is a coolant, such as Glysantin®, for example, or a glycol-water mixture, for which a coolant circuit is provided. The operating pressure of such coolant circuits is 2 bar to 5 bar, the circuits being designed for a bursting pressure of up to 10 bar.

In an alternative embodiment, the temperature-regulating medium is a refrigerant, such as 1,1,1,2-tetrafluoroethane (trade name "R 134a"), or 2,3,3,3-tetrafluoropropene (trade name "R 1234yf", from Honeywell). Such refrigerants are evaporated by corresponding pressure in a thermodynamic process and are introduced partly in gaseous form and partly in liquid form into the channel 13 of the temperature-regulating element 1. In this embodiment, the temperature-regulating element 1 is designed to withstand pressures of up to 42 bar which occur as a result of the gaseous refrigerant.

For optimizing the heat transfer it proves to be advantageous if the elevations (9) have an area proportion of 25% to 99% on the metallic plate (7).

In order to connect the temperature-regulating element (1) according to the invention to a further temperature-regulating element (1) or an alternative fixing means, at least one device (25) for connection is provided on the temperature-regulating element (1). Such a device (25) can be, for example, an apparatus for bracing two temperature-regulating elements (1) against one another. In specific terms, flange-like regions can be provided at the edge of the temperature-regulating element (1), by which regions two temperature-regulating elements (1) can be braced against one another by means of suitable fixing means such as screws or bolts.

The second object mentioned above is achieved in a second aspect of the present invention, in which the present invention relates to a method for producing a temperature-regulating element (1) such as has been described above. The method comprises the following steps:

introducing at least one slide into a first half of a two-part mold, providing a metallic plate (7) in the first half of the mold above the at least one slide, wherein the metallic plate (7) has elevations (9) at its top side and wherein a circumferential gap with respect to the mold remains free around the metallic plate (7), closing the two-part mold with a second half, introducing a plastic into the mold through at least two introduction points arranged above the metallic plate (7), wherein, as a result of the introducing, the metallic plate (7) is pressed onto the at least one slide and wherein the plastic is introduced at least through the circumferential gap into the lower part of the mold and forms a main body (11) in the process, releasing the main body (11) with the metallic plate (7) from the mold and removing the at least one slide, such that at least one continuous channel (13) is formed, attaching two connection components (17a, 17b) composed of plastic respectively to two opposite end faces (15a, 15b) between which the at least one channel (13) extends.

When introducing the at least one slide into a first half of a two-part mold, care should be taken to ensure that the slide is not arranged below one of the cutouts (21), thereby impeding the introduction of the plastic.

The metallic plate (7) is arranged in the first half of the mold such that it lies above the at least one slide, the elevations (9) facing away from the slide. Care should be taken here to ensure that a circumferential gap with respect to the mold remains free around the metallic plate (7). This can be ensured for example by means of so-called lost spacers composed of an insulating material (e.g. plastic). For the good distribution of the plastic it is advantageous if introducing the plastic is carried out via at least two introduction points arranged above the metallic plate (7). Preference is given to four introduction points or more.

The temperature-regulating element (1) is produced using, in particular, an injection-molding method in which a plastic melt is injected into a two-part injection mold, preferably through the introduction points, i.e. injection points. However, other methods can also be used, e.g. the introduction of (pourable) plastic granules that are melted only in the mold.

By means of the method according to the invention for producing a temperature-regulating element (1), the temperature-regulating element (1) can be produced simply and rapidly, without the need for extensive rework.

In a further aspect, the present invention relates to the use of a temperature-regulating element (1) such as has been described above in a lithium-ion battery (101). Here the temperature-regulating element (1) is used in particular for cooling and/or for heating lithium-ion cells (103) in the lithium-ion battery (101).

In yet another aspect, the present invention relates to a lithium-ion battery (101) comprising at least one lithium-ion cell (103) which is at least partly surrounded by a metallic enclosure (105), and at least one temperature-regulating element (1) such as has been described above, wherein the at least one lithium-ion cell (103) is arranged on the at least one temperature-regulating element (1) such that the metallic enclosure (105) is in contact with the thermally conductive surface (3) of the temperature-regulating element (1).

The temperature-regulating element (1) is suitable in particular for regulating the temperature of lithium-ion batteries (101) composed of one or more lithium-ion cells (103). It is advantageous here if the lithium-ion cells (103) are each at least partly surrounded by a metallic enclosure (105). The heat that arises in the individual lithium-ion cells (103) can be released to the temperature-regulating element (1) via the metallic enclosure (105) of said cells. In this case, the individual lithium-ion cells (103) can be situated freely on the temperature-regulating element (1) or be braced between two temperature-regulating elements (1) or be adhesively bonded to one or two temperature-regulating elements (1) at one or two sides.

The lithium-ion battery (101) according to the invention has the advantage that the lithium-ion cells (103) that said battery comprises can be optimally temperature-regulated since the temperature-regulating element (1) firstly ensures the dissipation of heat, while secondly a warm-up of the optimum temperature operating range is also ensured at low external temperatures.

In one development, the lithium-ion battery (101) furthermore comprises one or more fixing means (107) by which at least one lithium-ion cell (103) is connected to the at least one temperature-regulating element (1), and/or electrical connections (109) for the at least one lithium-ion cell (103).

Further features, advantages and possible applications are evident from the following description of the preferred examples, which do not restrict the invention, however, and the figures. In this case, all features described or rendered pictorially form per se, or in any combination, the subject matter of the invention, also independently of their summary in the claims or the dependency references thereof.

Figure 1:
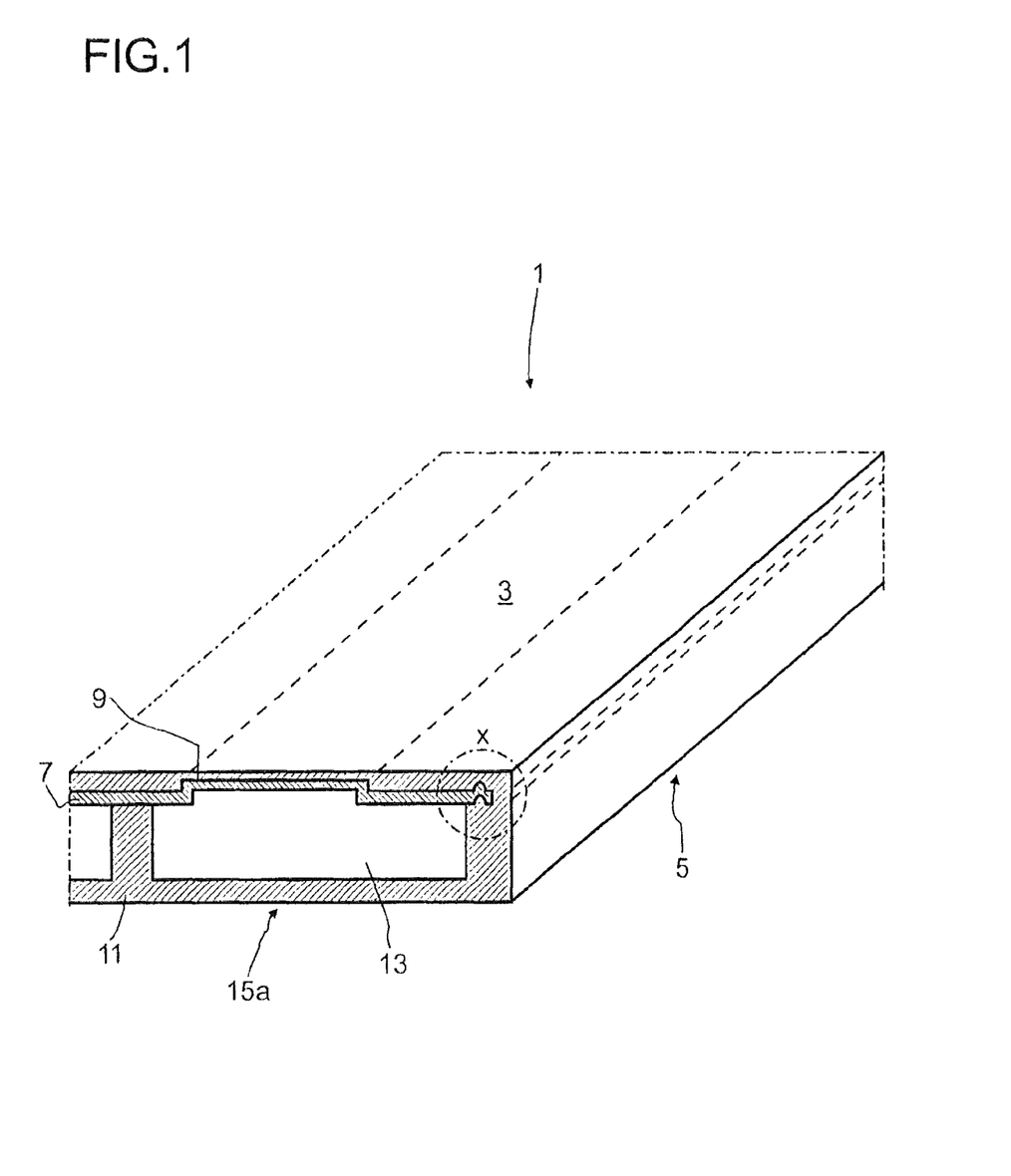
FIG. 1 shows a diagrammatic partial view of a temperature-regulating element (1) in a first embodiment of the invention.

FIG. 1 shows an excerpt from a first embodiment of the temperature-regulating element 1, in which a metallic plate 7 is substantially completely enclosed by the plastic of the main body 11. That is to say that in the lower region of the illustration the temperature-regulating element 1 is constructed completely from the plastic, while the upper part of the cross section illustrates the metallic plate 7 having the elevation 9, which are likewise covered by the plastic. In the illustration in FIG. 1, the thermally conductive surface 3 is situated at the top and the thermally insulating surface 5 is situated on the underside in a manner concealed by the illustration. It can be discerned from FIG. 1 that the channel 13 is delimited by the metallic plate 7 on its upper side and for the rest by the plastic of the main body 11.

In the illustration in FIG. 1, the metallic plate 7 is illustrated as a plate in which the elevations 9 were produced by stamping/embossing, for example, such that a depression arises opposite the elevation 9 on the other side of the metallic plate 7. However, the metallic plate 7 can also be produced in a different way, for example by milling or extrusion or other shaping techniques known to the person skilled in the art, such that opposite the elevation 9 a substantially smooth area is formed on the underside of the metallic plate 7.

The view in FIG. 1 simultaneously illustrates the end face 15a from which at least one channel 13 extends to the opposite end face 15b (not illustrated). While the metallic plate 7 is surrounded by the plastic of the main body 11 at the sides and, consequently, electrical insulation and thus a sufficient electrical breakdown strength are ensured, the metallic plate 7 can be exposed at the end faces 15a, 15b since here the connection components 17a, 17b comprised of plastic are also arranged and then cover and electrically insulate the exposed metallic plate 7 (cf. FIG. 4).

Figure 2:
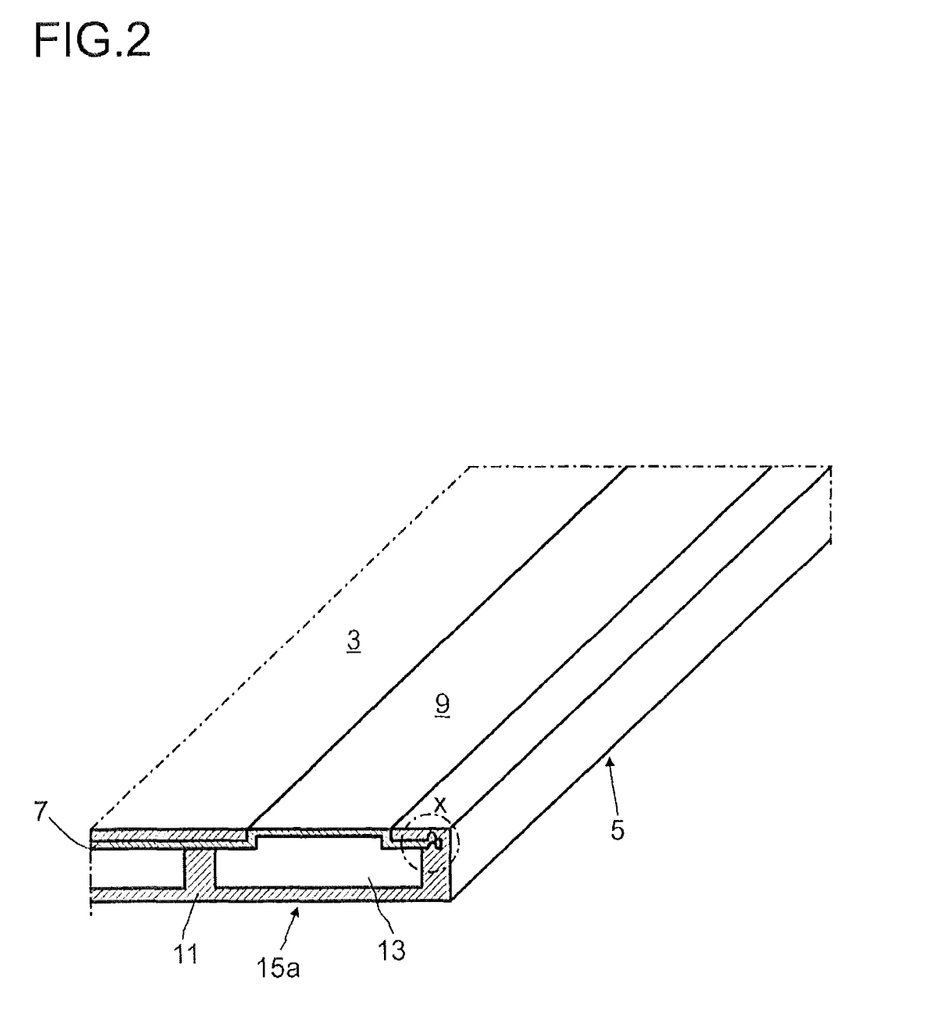
FIG. 2 shows a diagrammatic partial view of a temperature-regulating element (1) in a second embodiment of the invention.

FIG. 2 is an alternative embodiment of the temperature-regulating element 1 with respect to FIG. 1, in which the elevation 9 is not covered by the plastic of the main body 11, but rather is exposed at the thermally conductive surface 3. Otherwise, this embodiment is identical to the first embodiment (cf. FIG. 1).

Figure 3:
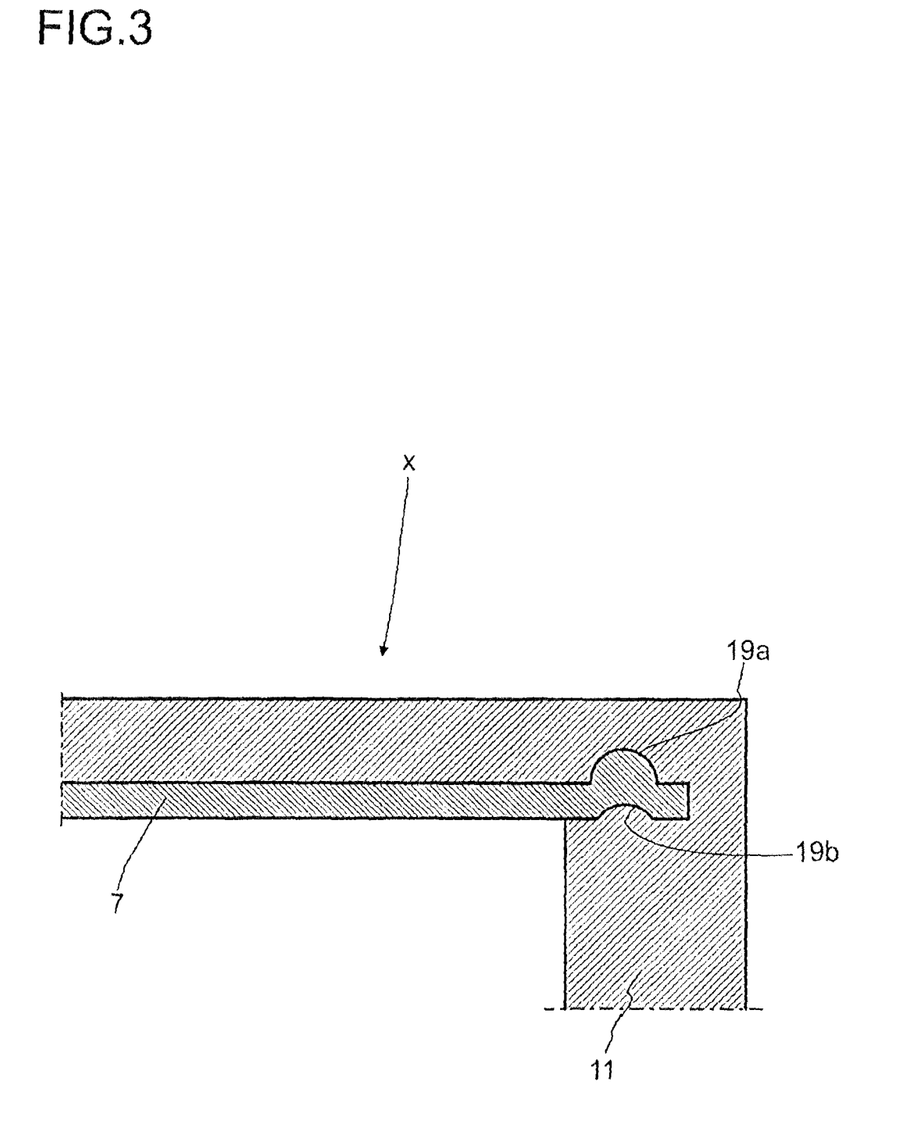
FIG. 3 shows a partial view—designated by X in FIGS. 1 and 2—of a temperature-regulating element (1) according to the present invention.

FIG. 3 shows the detail region designated by X in FIGS. 1 and 2. This sectional illustration reveals a part of the plastic main body 11 which covers an edge region of the metallic plate 7 in which a bead 19a and/or a groove 19b are/is formed. As can be gathered from the illustration in FIG. 3, a positively locking connection between the metallic plate 7 and the plastic main body 11 is produced thereby.

Figure 4:
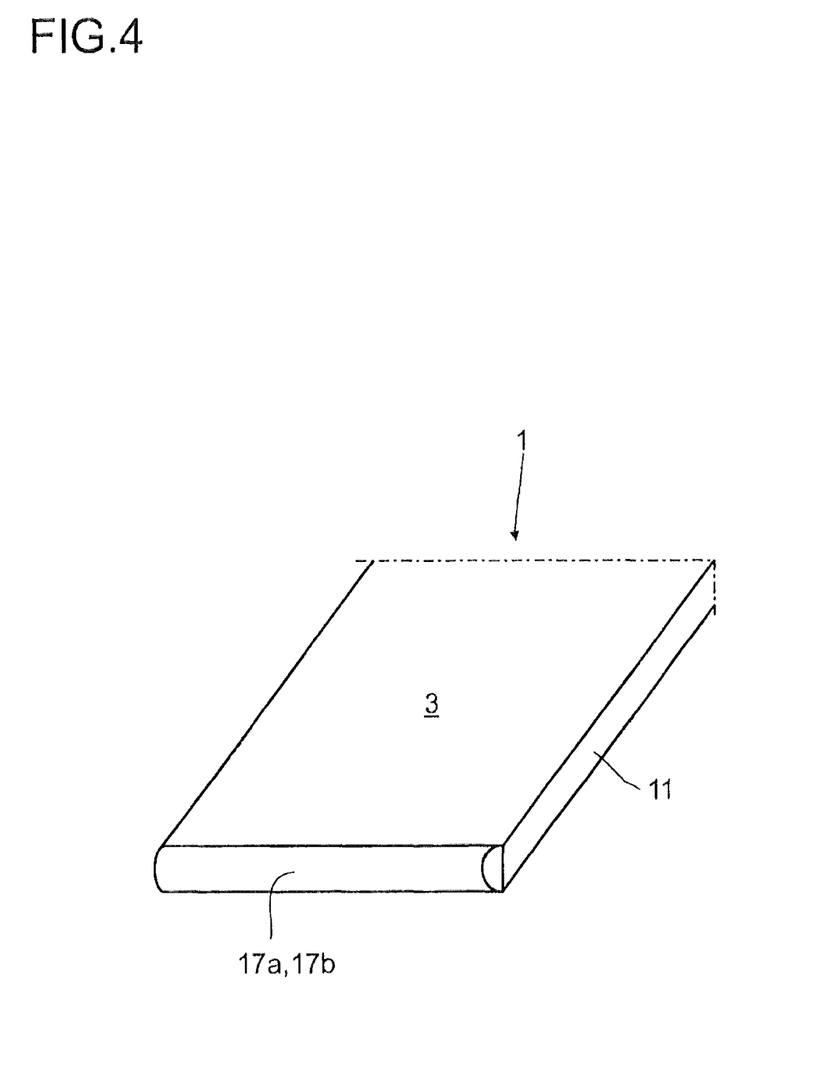
FIG. 4 shows a diagrammatic partial view of a temperature-regulating element (1) according to the present invention.

FIG. 4 shows a partial view of the temperature-regulating element 1 in the first embodiment of the invention, in which the elevations 9 are covered by the plastic of the main body 11. Moreover, one of the connection components 17a, 17b at one of the end faces 15a, 15b is shown. As has been described above, as a result the corresponding end face 15a, 15b is covered, an electrical insulation of the edge of the metallic plate 7 is ensured and a connection or a diversion or distribution of the temperature-regulating medium flowing through the channel 13 is furthermore made possible. This figure does not illustrate the possibility of the feeding and discharging of the temperature-regulating medium into a temperature-regulating circuit being respectively realized through one of the connection components 17a, 17b, said temperature-regulating circuit being situated outside the temperature-regulating element 1.

Figure 5:
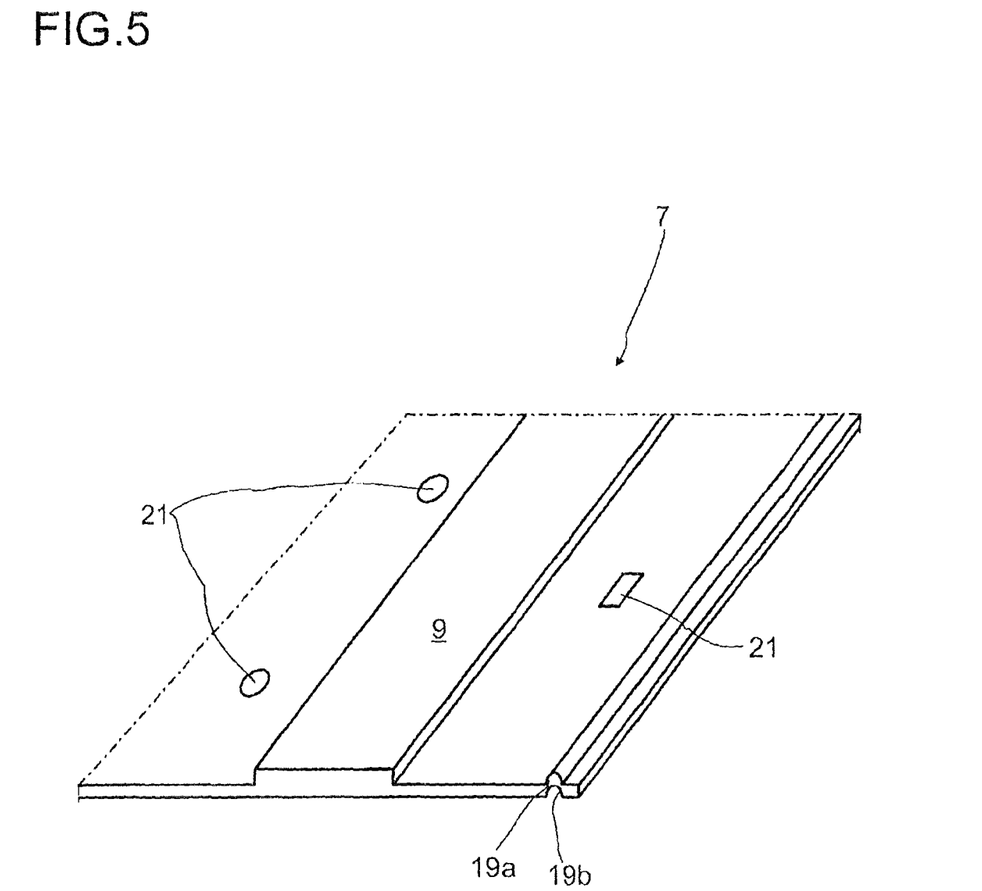
FIG. 5 shows a diagrammatic partial view of a metallic plate (7) according to one embodiment of the invention.

FIG. 5 partly illustrates a specific embodiment of the metallic plate 7 having one or more continuous cutouts 21 in the regions without elevations 9. This illustration is merely by way of example and shows different geometries and arrangements of the cutouts 21. Moreover, the illustration in FIG. 5 shows the embodiment—already mentioned above—of the metallic plate 7 having a substantially smooth area on the opposite side of the elevations 9.

Figure 6:
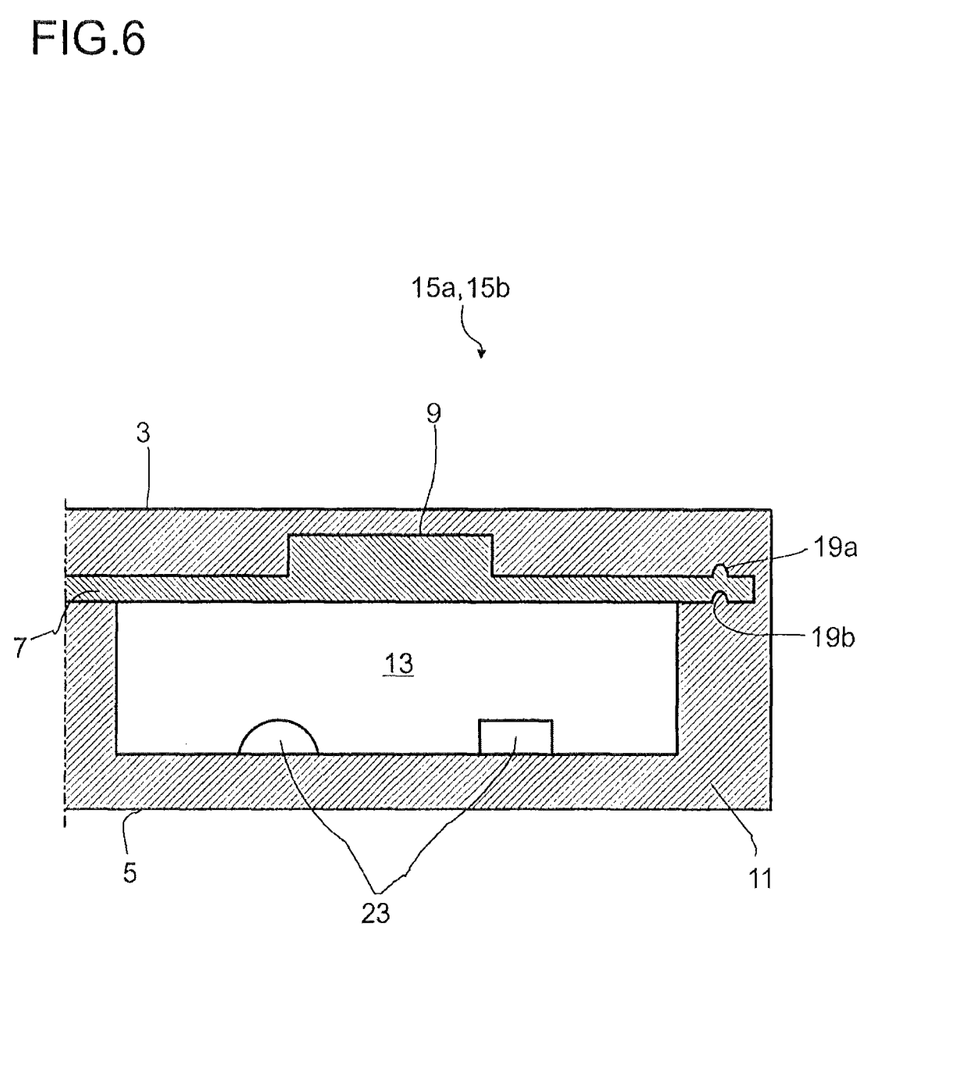
FIG. 6 shows a diagrammatic partial cross-sectional view of a temperature-regulating element (1) according to the present invention.

FIG. 6 is a cross-sectional view of the channel 13. In the illustration in FIG. 6, the channel 13 is delimited at the top by the metallic plate 7 having the elevation 9. Laterally and at the bottom, the channel 13 is embedded into the plastic main body 11. Internals 23 are provided in the channel 13 and on the one hand serve for a better pressure distribution of a pressurized temperature-regulating medium and/or on the other hand bring about swirling of the flowing temperature-regulating medium to the temperature-regulating element 1, with the result that no laminar flows form with regard to the temperature, rather the temperature-regulating medium is substantially at a uniform temperature.

Figure 7:
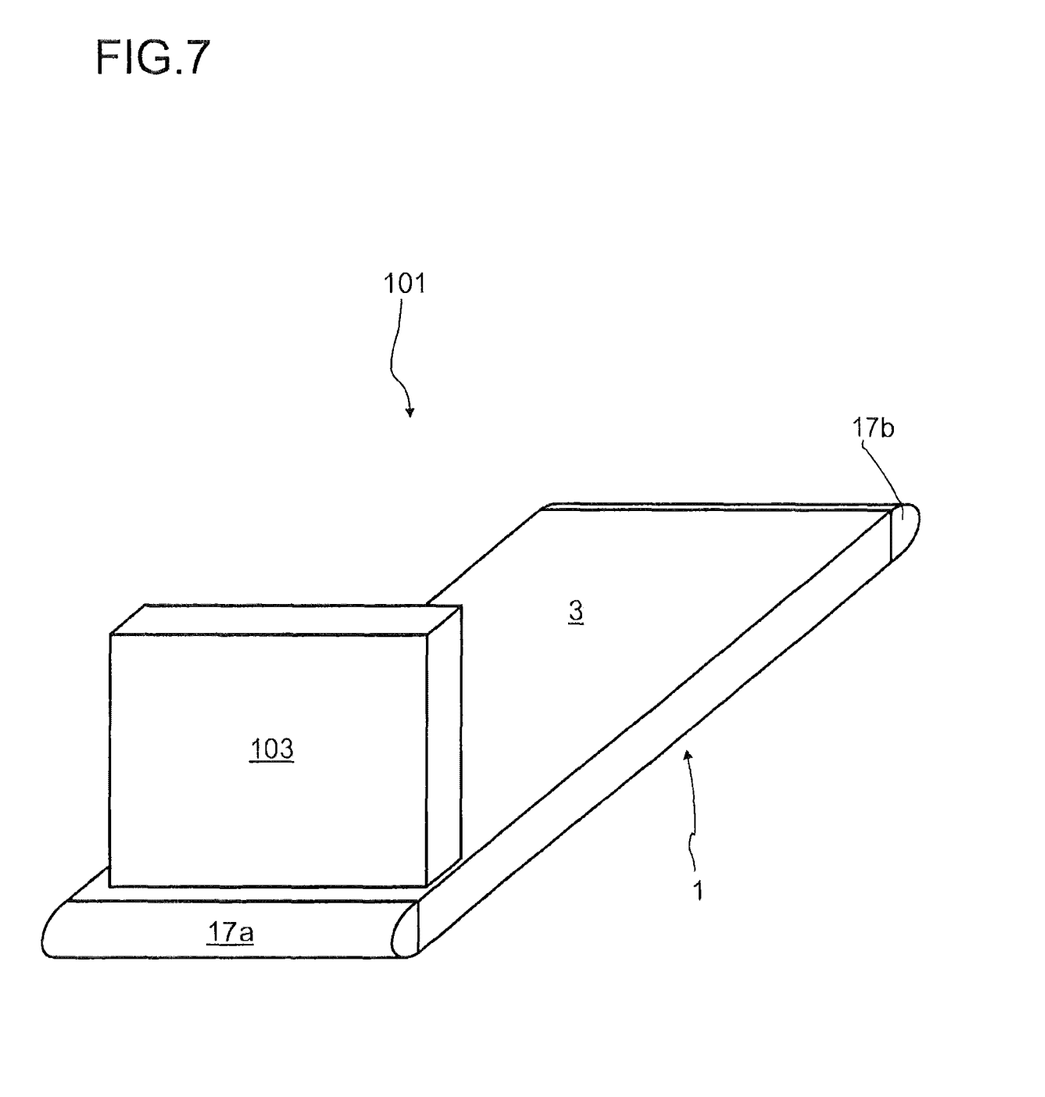
FIG. 7 shows a diagrammatic partial view of a lithium-ion battery (101).

FIG. 7 shows a partial view of a lithium-ion battery 101 in which, by way of example, an individual lithium-ion cell 103 is arranged on a temperature-regulating element 1. In one preferred embodiment, the lithium-ion cell 103 at least partly has a metallic housing and with the latter is in contact with the thermally conductive surface 3 of the temperature-regulating element 1. In this case, purely mechanical contact can be made between the lithium-ion cell 103 and the temperature-regulating element 1, for example by a second temperature-regulating element 1 being placed onto the lithium-ion cell 103 from above and then both temperature-regulating elements 1 being braced against one another, such that the lithium-ion cell 103 is held therebetween. Alternatively, the lithium-ion cell 103 can be adhesively bonded onto the temperature-regulating element 1 using a suitable adhesive, the adhesive having on the one hand an electrically insulating and on the other hand a thermally conductive effect.

In one specific embodiment of the lithium-ion battery, ten lithium-ion cells 103 each surrounded by an aluminum housing are pressed together and placed by their base onto a temperature-regulating element 1, with the result that optimum heat dissipation with very good heat transfer is realized. Depending on the installation situation, a simple frame for bracing with the temperature-regulating element 1 can be provided on the top side of the ten lithium-ion cells 103 or a second temperature-regulating element 1 is placed and braced with the first temperature-regulating element 1.

In this way, a multiplicity of lithium-ion batteries 101 can be joined together to form a larger unit, without excessive heating occurring. The individual lithium-ion batteries 101 can be connected to a temperature-regulating medium circuit either individually, in parallel or in series.

In embodiments in which the temperature-regulating element 1 is used only as a cooling element, the corresponding cooling medium can be guided into a low-pressure process. If the temperature-regulating element 1 is intended to bring about not only cooling but also heating, for example of the lithium-ion battery, the corresponding temperature-regulating medium has to be guided in a high-pressure process, which leads to specific requirements with regard to the design of the temperature-regulating element 1. In particular, consideration should be given to ensuring the pressure-tightness of the material transition between metallic plate 7 and plastic main body 11.

This can advantageously be achieved by virtue of the fact that the plastic of the main body 11 slightly contracts in the course of cooling during production and forms a prestressed positively locking fit. The bead 19a and/or the groove 19b act(s) like a so-called labyrinth seal and additionally prevent(s) the refrigerant from migrating under the material separating boundary.

In one embodiment, the present invention relates to a method for producing the temperature-regulating element 1. For this purpose, for each channel 13 provided, a slide is inserted into the lower half of a two-part injection mold. Afterward, the metallic plate 7 is placed from above onto the slide or slides, the elevations 9 on the metallic plate 7 facing upward.

The surface of the metallic plate 7 can be suitably pretreated in the regions which are encapsulated with the plastic by injection molding. By way of example, a mechanical (grinding) or physical (plasma spraying) treatment can be carried out or the surface can be modified chemically (etching, application of an adhesion promoter) in order to ensure improved connection of the plastic to the metallic plate 7.

A circumferential gap with respect to the injection mold is kept free around the metallic plate 7. After the two-part injection mold has been closed, a corresponding plastic melt is injected into the injection mold through at least two injection points, preferably four injection points, the injection points being arranged above the metallic plate 7. As a result of the injection pressure of the plastic melt, the metallic plate 7 is pressed fixedly onto the slide or slides, thus preventing the formation of a gap into which the plastic melt can penetrate. The plastic melt flows through the circumferential gap and the cutouts 21 present in the metallic plate 7 into the lower part of the injection mold and substantially completely encloses the slides, such that the channels 13 are delimited by the metallic plate 7 on their top side and by the plastic of the main body 11 laterally and at the bottom.

After the plastic has been cured and the main body 11 has been released from the mold, the slides are withdrawn, such that they release the channels 13. In this case, the internals 23 are advantageously arranged in the mold-release direction of the slides. An offset of the internals 23 can likewise be realized, however, if a divided slide is used which is withdrawn from the main body 11 in opposite directions.

Finally, the connection components 17a, 17b, which are preferably formed from the same plastic as the main body 11, are attached, in particular welded, to the end faces 15a, 15b in order thus to form the finished temperature-regulating element 1.

In a further embodiment, a temperature-regulating element 1 according to the invention is produced in a relatively small format. A plurality of these small-format temperature-regulating elements 1 are then combined modularly to form a larger temperature-regulating element. The modular design has the advantage that with a small-format standard size, by variably joining individual temperature-regulating elements 1, it is possible to produce different sizes and geometries of temperature-regulating elements with only one basic mold, for example one injection mold. The individual small-format temperature-regulating elements 1 are joined together in a suitable manner; advantageously, they are welded or adhesively bonded to one another at their longitudinal sides or end faces.

In the present invention, the temperature-regulating element 1 according to the invention is described principally with regard to its use in a lithium-ion battery. It can also be used, in principle, for regulating the temperature of other components that can be temperature-regulated, for example for cooling semiconductor apparatuses, for regulating the temperature of fuel cells or for cooling electrical connections.

LIST OF REFERENCE SIGNS

1 Temperature-regulating element
3 Thermally conductive surface
5 Thermally insulating surface
7 Metallic plate
9 Elevations
11 Main body composed of plastic
13 Channel
15a, b End faces
17a, b Connection components
19a Bead
19b Groove
21 Cutout
23 Internals
25 Device for connection

The invention claimed is:

1. A temperature-regulating element having a thermally conductive surface and a thermally insulating surface, the temperature-regulating element comprising:
 a metallic plate, which is arranged at the thermally conductive surface and which has elevations at its side facing the thermally conductive surface;
 a main body comprising plastic, which is substantially arranged on the side of the thermally insulating surface and which at least partly surrounds the metallic plate;
 at least one continuous channel for receiving a temperature-regulating medium which is formed between the metallic plate and the main body in such a way that at least one wall of the at least one channel is formed by the metallic plate and remaining walls of the at least one channel are formed by the main body, wherein the at least one channel extends from one end face to an opposite end face of the main body; and
 two connection components comprising plastic, which are respectively arranged at the end faces and connect the at least one channel to a temperature-regulating medium circuit,
 wherein the temperature-regulating element is designed such that the main body surrounds the metallic plate at the side thereof facing the thermally conductive surface at least in regions which have no elevations, and that the main body at least partly surrounds the metallic plate marginally.

2. The temperature-regulating element according to claim 1, wherein the elevations are covered by the plastic of the main body in the thermally conductive surface.

3. The temperature-regulating element according to claim 1, wherein the elevations are exposed in the thermally conductive surface.

4. The temperature-regulating element according to claim 1, wherein the metallic plate has marginally at least partly a bead or groove.

5. The temperature-regulating element according to claim 1, wherein:
 the elevations are distributed substantially uniformly on the metallic plate; or
 the elevations are arranged on the metallic plate such that they substantially correspond to regions of an object to be temperature-regulated which are to be temperature-regulated the most intensively, or wherein
 the elevations are arranged on the metallic plate such that they substantially correspond to the at least one channel.

6. The temperature-regulating element according to claim 1, wherein at least one continuous cutout through which the plastic of the main body penetrates is provided in the metallic plate in the regions without elevations.

7. The temperature-regulating element according to claim 1, wherein the metallic plate comprises aluminum.

8. The temperature-regulating element according to claim 1, wherein the plastic of the main body is selected from polyamides or polyesters.

9. The temperature-regulating element according to claim 1, wherein the plastic of the main body comprises additives or reinforcing materials.

10. The temperature-regulating element according to claim 1, wherein internals for pressure distribution or for swirling of the temperature-regulating medium are provided in the at least one channel.

11. The temperature-regulating element according to claim 1, further comprising at least one device for connection to a further temperature-regulating element or a different fixing means.

12. A method for producing a temperature-regulating element of claim 1, the method comprising the following steps:
 introducing at least one slide into a first half of a two-part mold;
 providing a metallic plate in the first half of the two-part mold above the at least one slide, wherein the metallic plate has elevations at its top side and wherein a circumferential gap with respect to the two-part mold remains free around the metallic plate;
 closing the two-part mold with a second half
 introducing a plastic into the two-part mold through at least two introduction points arranged above the metallic plate wherein, as a result of the introducing, the metallic plate is pressed onto the at least one slide and wherein the plastic is introduced at least through the circumferential gap into a lower part of the two-part mold and forms a main body in the process, releasing the main body with the metallic plate from the two-part mold and removing the at least one slide, such that at least one continuous channel is formed; and attaching two connection components composed of plastic respectively to two opposite end faces between which the at least one channel extends.

13. A lithium-ion battery, comprising at least one lithium-ion cell which is at least partly surrounded by a metallic enclosure; and at least one temperature-regulating element according to claim 1, wherein the at least one lithium-ion cell is arranged on the at least one temperature-regulating element such that the metallic enclosure is in contact with the thermally conductive surface of the temperature-regulating element.

14. The lithium-ion battery according to claim 13, further comprising:

one or more fixing means by which the at least one lithium-ion cell is connected to the at least one temperature-regulating element; or electrical connections for the at least one lithium-ion cell.

\* \* \* \* \*